Figure 1:
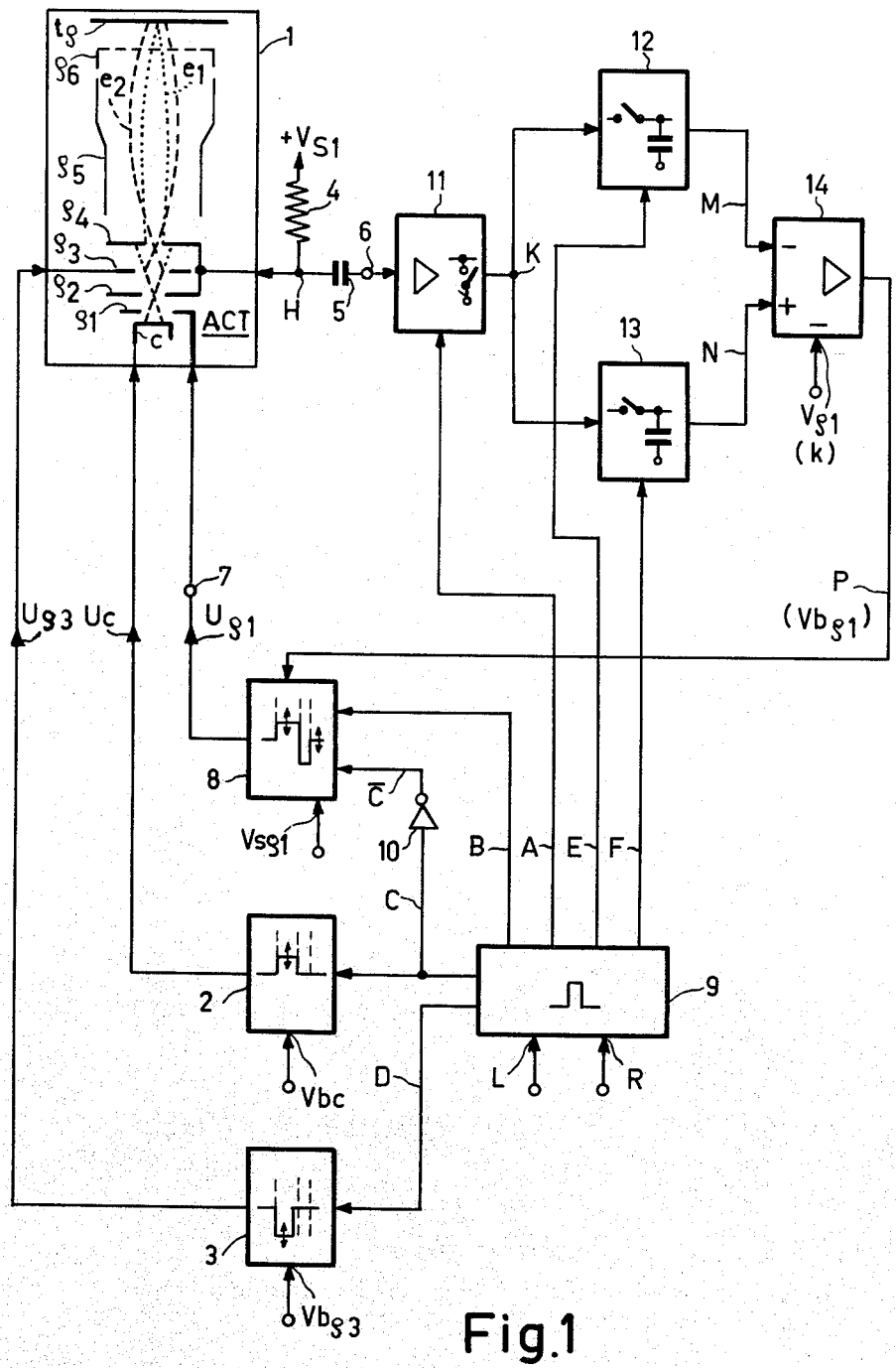

United States Patent [19]
van den Berg

[11] 3,955,116
[45] May 4, 1976

[54] CIRCUIT ARRANGEMENT SUITABLE FOR USE IN A TELEVISION PICK-UP TUBE PROVIDED WITH AN ANTI-COMET TAIL ELECTRON GUN

[75] Inventor: Wouter van den Berg, Eindhoven, Netherlands

[73] Assignee: U.S. Philips Corporation, New York, N.Y.

[22] Filed: Sept. 9, 1974

[21] Appl. No.: 504,057

[30] Foreign Application Priority Data
Sept. 7, 1973 Netherlands .................. 7312332

[52] U.S. Cl. .............................. 315/10; 315/383; 357/31
[51] Int. Cl.² ........................................ H01J 31/26
[58] Field of Search ............ 315/31 R, 31 TV, 379, 315/381–385, 10–12; 357/31

[56] References Cited
UNITED STATES PATENTS
3,548,250 12/1970 Van Roosmalen et al. ..... 315/31 TV
3,644,669 2/1972 Slavik ................................ 315/383

Primary Examiner—Maynard R. Wilbur
Assistant Examiner—T. M. Blum
Attorney, Agent, or Firm—Frank R. Trifari; Henry I. Steckler

[57] ABSTRACT

An automatic control for the optimum control voltage during the line flyback time between the control electrode and the cathode of an ACT gun in a television pick-up tube. A variation in the cathode potential during the line flyback requires inter alia an adaptation of the control electrode potential. Without this adaptation a too small beam current on the target would result in an insufficient erasing action while a too large beam current would result in an inadmissible dark current with the risk of persistence upon display (afterglow). In the circuit arrangement a measurement of the beam current is effected through a specific choice of the lens pulse duration at the gun, which beam current becomes available for the erasing action on the target during the line flyback time, and through comparison with a reference value a variable pulse generator is controlled for supplying the control electrode pulse with a given pulse height during the line flyback time.

9 Claims, 3 Drawing Figures

CIRCUIT ARRANGEMENT SUITABLE FOR USE IN A TELEVISION PICK-UP TUBE PROVIDED WITH AN ANTI-COMET TAIL ELECTRON GUN

The invention relates to a circuit arrangement suitable for use in a television camera tube provided with an anti-comet tail electron gun, formed with a cathode, a control electrode, anode electrodes and a lens electrode for generating during line scan times and line flyback times an electron beam having different values for the beam diameter, beam current intensity and beam potential upon impingement of a target present in the tube under the control of a control voltage between the control electrode and the cathode having a cathode potential and a lens voltage between the lens electrode and an adjacent anode electrode, one line period being constituted by the line scan time and a line blanking time comprising the line flyback time and a beam blanking time.

A television camera tube formed with such an electron gun is described in U.S. Pat. No. 3,548,250. The gun gives the originally linearly varying pick-up characteristic between light incident on the target and coming from a scene to be picked up and the picture signal generated by the camera tube a limitation because the pick-up characteristic varies more or less flatly after a knee. Without using the gun a locally excessive exposure of the target would have the result that the potential image corresponding to the scene cannot be completely neutralized by the scanning electron beam during the line scan time, that is to say, the line sweep. The non-neutralized remaining charge causes a contrast loss upon display. A displacement of the locally excessive exposure on the target results in a comet tail upon display.

The anti-comet tail electron gun generates an electron beam during a line flyback time preceding a line sweep, which beam scans the target with an instantaneously enlarged beam diameter and beam current intensity. The cathode potential and hence the potential of the electron beam at the landing spot on the target is instantaneously increased. The increase of the cathode potential fixes the knee in the pick-up characteristic because a still higher potential in the potential image on the target obtained by a locally excessive exposure is brought to the less increased beam potential prior to the normal line scan during the sweep.

The charge neutralization on the target effected during the line flyback time requires, in case of a desired cathode potential for fixing the said knee in the pick-up characteristic, a certain control voltage between the control electrode and the cathode fixing the required beam current intensity and a certain voltage between the lens electrode and anode electrodes present on both sides thereof, which lens voltage determines the beam current intensity and diameter at the area of the target by forming beam nodes in the generated electron beam at the area of the anode electrode. An adjustment, displacement or a variation being effected by some cause or other in one of the potentials on the cathode, the control electrode and the lens electrode requires an adaptation of the two other potentials for obtaining optimum operation during the line flyback time. Thus there applies that for an adjusted value of the cathode potential for the desired fixation of the knee and a charge neutralization adjusted in an optimum manner through a suitable lens voltage the value of the potential on the control electrode determines the maximum possible beam current, i.e. the maximum charge neutralization to be effected on the target. This maximum possible charge neutralization fixes the highest light intensity on the target while the operation of the gun during the line flyback time is still effected in the correct manner. For a too low maximum value an insufficient charge neutralization is effected and in case of a too high maximum value to the too large beam current results in an inadmissibly increased dark current. The value of the increased dark current is not constant during scanning over the entire target surface and the too large value of the beam current results in a greater risk of persistance upon display (so-called afterglow). Furthermore there are differences between the camera tubes each having their own non-linearly varying current-control voltage characteristic so that generally it is not possible to give a certain value for the control voltage for obtaining an optimum adjusted maximum beam current during the line flyback time.

An object of the invention is to realize a circuit arrangement with which an optimum adjustment of the control voltage during the line flyback time is automatically obtained in a camera tube formed with an anti-comet tail electron gun. To this end the circuit arrangement according to the invention is characterized in that is provided with an input for connection to an anode electrode provided in the camera tube, a measuring circuit being connected to said input which is active during the line blanking time while the cathode potential and the control voltage are increased during the line flyback time and the lens voltage is decreased during a first part of the line flyback time for obtaining the target scanning, said measuring circuit being formed for a difference current measurement at the said anode electrode between the current during the said first part of the line flyback time and that during a second part thereof, said measuring circuit being connected to a comparison circuit for comparing the result of said current measurement with a reference value, said comparison circuit being connected to a variable pulse generator for applying with a pulse height to be varied a pulse having the line flyback duration to the output of the circuit arrangement which is connectible to said control electrode of the camera tube.

Figure 2:
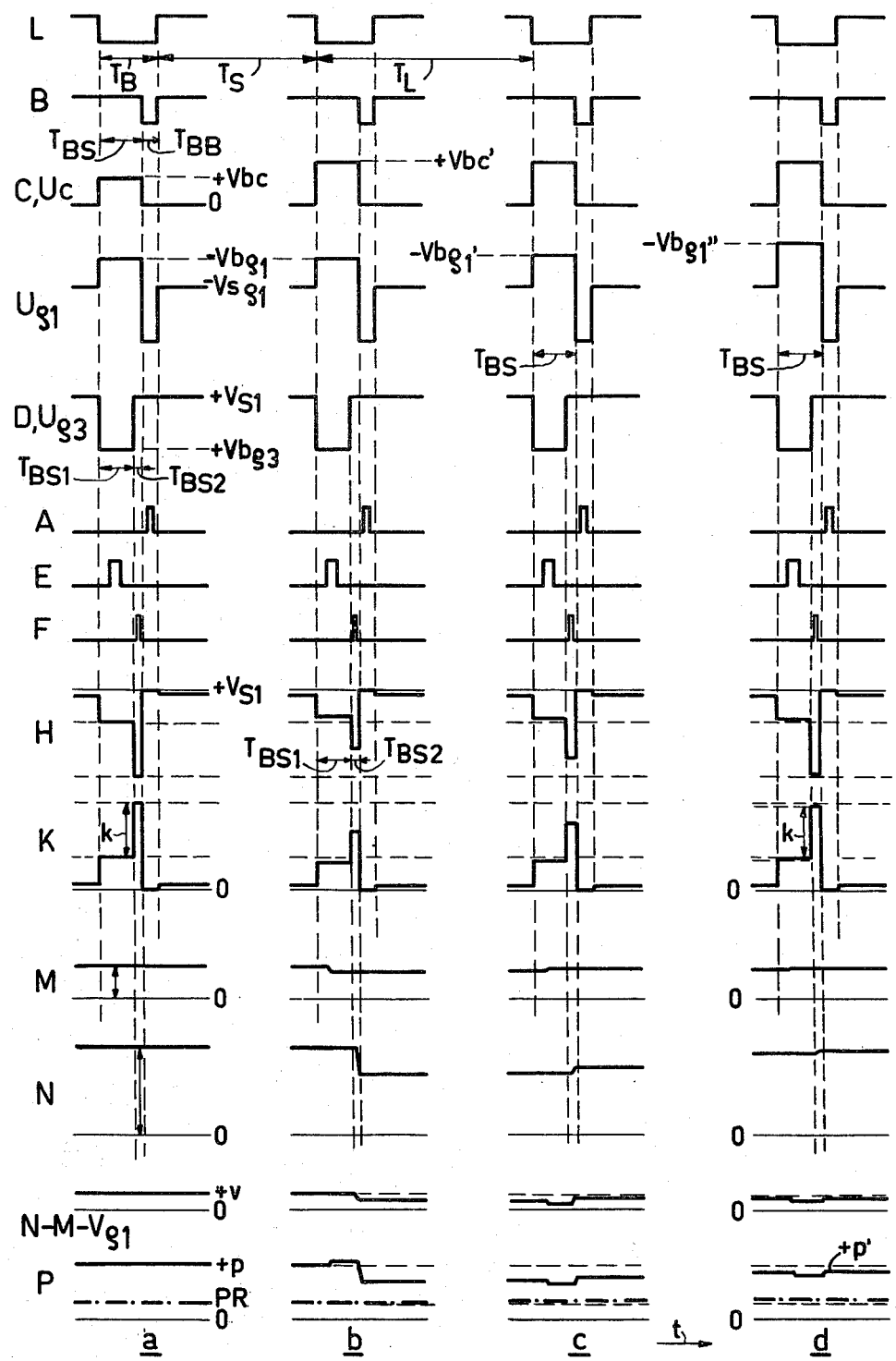
Figure 3:
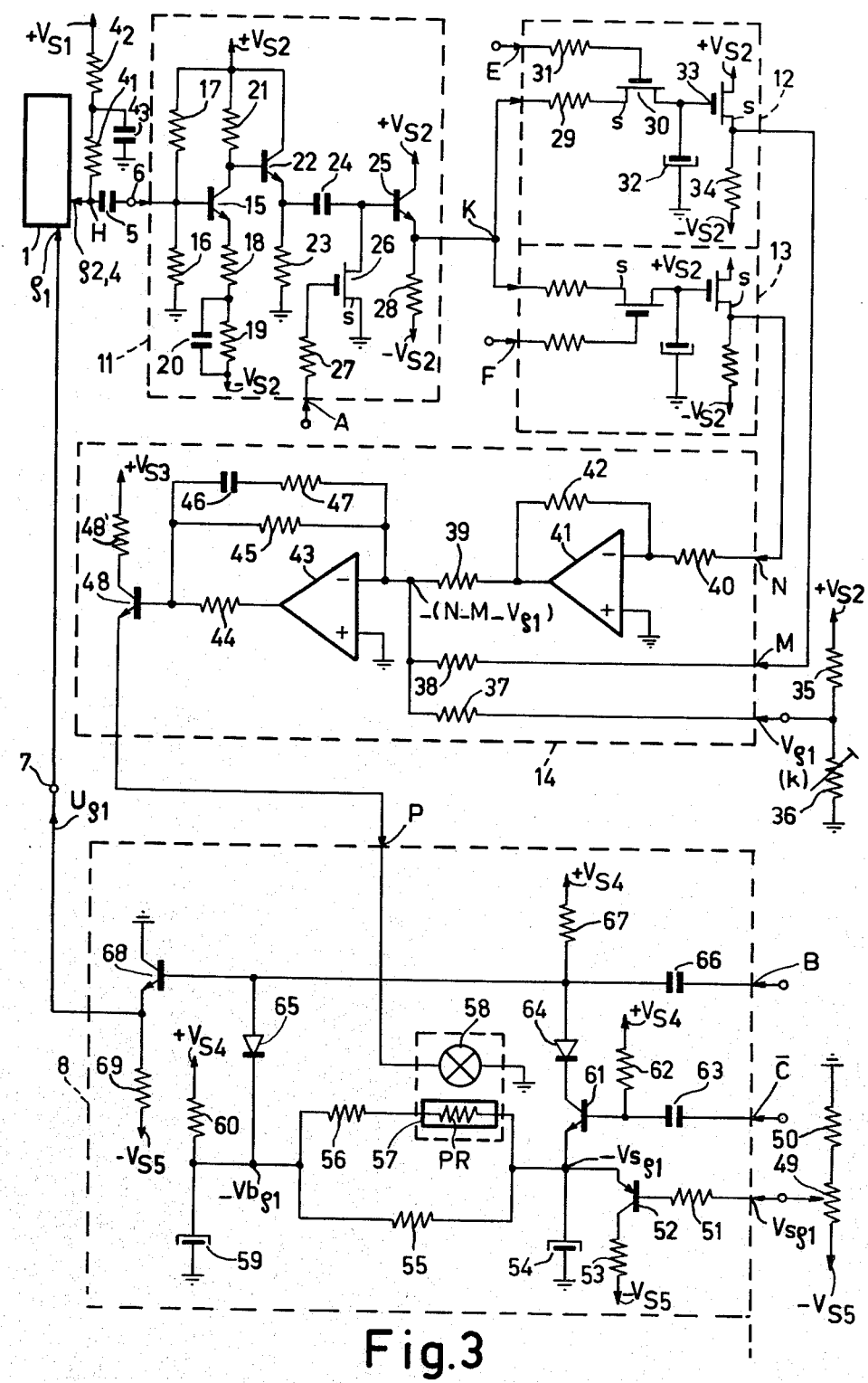

The invention will be described in greater detail by way of example with reference to the following Figures in which FIG. 1 shows the circuit arrangement according to the invention in a block-schematic diagram FIG. 2 shows some signals occurring in the block-schematic diagram according to FIG. 1 and FIG. 3 shows the circuit arrangement according to the invention in detail.

In FIG. 1 the reference numeral 1 denotes a television camera tube and two adjustable pulse generators 2 and 3 connected thereto which supply signals $U_c$ and $U_{g_3}$, respectively. The camera tube 1 includes some components which are diagrammatically shown while the connections of some of these components to the exterior of the tube 1 are shown in so far as they are important for understanding the invention. Although they are essential for the operation, deflection coils arranged outside the tube 1 and a focussing coil etc. are less important for explaining the invention and are therefore omitted. The camera tube 1 successively includes: a cathode $c$, a control electrode $g_1$, a first anode electrode $g_2$, a lens electrode $g_3$, a second anode electrode $g_4$ connected to the first, a collector anode electrode $g_5$, a gauze anode electrode $g_6$ and a target $tg$. The cathode $c$ and the electrodes $g_1, g_2, g_3$ and $g_4$ constitute an electron gun ACT which can be characterized by its structure ($c, g_1 \ldots g_4$) as an anti-comet tail electron gun. The composite anode electrode $g_{2,4}$ is fed through a resistor 4 from a terminal conveying a voltage $+V_{S1}$ which terminal forms part of a supply source $V_{S1}$ of which another terminal not shown is connected to ground, which also applies to other supply voltages $V_S$ to be further referred to. Furthermore the anode electrode $g_{2,4}$ is connected through a capacitor 5 to an input 6 of the circuit arrangement according to the invention, which is provided with an output 7 connected to the control electrode $g_1$. The circuit arrangement (6,7) supplies a signal $Ug_1$ in a manner to be described hereinafter through the output 7. In the circuit arrangement (6,7) the signal $Ug_1$ is supplied by a variable pulse generator 8 to which a pulse generator 9 is connected which is furthermore connected to the adjustable pulse generators 2 and 3. Control signals R and L are applied to the pulse generator 9. The signal R is associated with the field scanning conventionally used in television with a scan period and a blanking period while the signal L is associated with the line scanning. Under the control of the signals L and R the pulse generator 9 supplies some signals A, B, C, D, E and F during the field scan period which are plotted with the signals U and L and with signals to be further shown in FIG. 2. The voltage values of the signals shown in FIG. 2 are not plotted on a scale. Some specific voltage or potential values are further referred to ($Vs, Vb$). The signal R, which is not shown, blocks the electron gun ACT during the field blanking period through the pulse generator 9.

FIG. 2 shows a broken-line time axis T while FIGS. 2a, 2b, 2c and 2d show some periodically occurring time durations. The periodically occurring time durations shown in FIGS. 2a, 2b and 2c succeed each other while between those of FIGS. 2c and 2d some time durations occur which are not shown. In the control signal L associated with the line scan a periodically occurring line period is plotted in FIG. 2 with $T_L$ which period consists of a line scan time $T_S$ and a line blanking time $T_B$. In the signal B it is shown that the line blanking time $T_B$ is subdivided in a line flyback time $T_{BS}$ and a beam blanking time $T_{BB}$. With the pulse in the time $T_{BB}$ the signal B is active as a beam blanking signal. The line blanking time $T_B$ and the line scan time $B_S$ are laid down in accordance with a television standard, but may slightly deviate therefrom in the circuit arrangement according to FIG. 1 as is common practice in television pick-up equipment in which, for example, a line control signal L is used with a negative going pulse of 11 $\mu$s which falls within the standard line blanking time of 12 $\mu$s. For the simplicity of the description these differences between the television standard and commonly used times in pick-up equipment are not further considered. Likewise time differences which are irrelevant to the invention may occur between simultaneously occurring pulse edges in FIG. 2.

To explain the operation of the anti-comet tail gun ACT it is sufficient to consider the signals $Uc, Ug_1$ and $Ug_3$ of, for example, FIG. 2a in which the anode electrode $g_{2,4}$ is connected to the voltage $+V_{S1}$. During the line scan time $T_S$, i.e. the line sweep a voltage at the lens electrode $g_3$ is substantially equal to that at the anode electrode $g_{2,4}$, while the cathode $c$ is connected, for example, to the ground potential of 0 volt and the control electrode $g_1$ conveys such a large negative voltage $-Vsg_1$ that an electron beam is generated which is denoted by $e_1$ in the pick-up tube 1. The beam $e_1$ focussed in the correct manner on the target $tg$ scans the target by means of deflection means and a potential image present thereon is neutralized thereby, that is to say, the target $tg$ is brought to the ground potential in the landing spot of the electron beam. The potential image is obtained by projecting the light from a scene onto the target $tg$ which consists of a transparent electrically conducting signal plate connected through a resistor to a voltage source and a semi-conductor layer, so that the photons of the light reduce the local leakage resistance of the semiconductor layer. The picture signal generated by the tube 1 is derived from the signal plate of the target $tg$.

During the line blanking time $T_B$ the pick-up tube 1 does not generate a picture signal for further processing and display in a display device. Normally the voltage at the control electrode $g_1$ has been rendered negative to such an extent that the gun does not generate an electron beam. According to the anti-comet tail principle the gun ACT generates an electron beam during part of the normal line blanking time $T_B$ which is denoted by $e_2$ in FIG. 1. Only during the beam blanking time $T_{BB}$ is the electron beam blanked. During the line flyback time $T_{BS}$ the voltage ($Ug_1$) at the control electrode $g_1$ is rendered negative to such a slight extent ($-Vbg_1$) that the current intensity of the beam $e_2$ may be some hundreds of times larger than that of the beam $e_1$; here the lens electrode $g_3$ serves its purpose by constituting a beam node in the electron beam at the area of the holes in the anode electrodes $g_2$ and $g_4$. The low positive voltage $+Vbg_3$ which is present in the manner shown in FIG. 2 is essential for the present invention only in a part instead of in the normally complete line flyback time $T_{BS}$ at the lens electrode $g_3$ determines relative to the anode electrodes $g_2$ and $g_4$ with the high positive voltage $V_{S1}$ the position of the beam nodes. The beams $e_1$ and $e_2$ shown in FIG. 1 show the influence of the lens electrode $g_3$. In order to prevent that the beam $e_2$ with the larger diameter and current intensity occurring during the line flyback erases the desired information on the target $tg$, it is essential that the cathode $c$ is at a chosen adjusted positive potential $+Vbc$ during the flyback time $T_{BS}$. The increased cathode potential $+Bbc$ determines the potential of the electron beam landing spot on the target $tg$ and the potential image will be neutralized (erased) to this potential. The desired information in the potential image occurring between the ground potential and the increased cathode potential $+Vbc$ is not influenced during the line flyback time $T_{BS}$. Before a television line is read during the line scan time $T_S$ a possibly present excessively high potential in the potential image on the target $tg$ is removed by means of the gun ACT so that the pick-up characteristic between incident light and the picture signal generated by the camera tube 1 does not vary linearly but gets a knee to a flatly varying part.

It is assumed that the pulse generator 3 of FIG. 1 supplies the signal $Ug_3$ with a pulse value $+Vbg_3$ ensuring an optimum erasing action under the supply of a bias/control voltage $Vbg_3$ and the signal D, which means that the beam nodes in the electron beam $e_2$ are present in the correct manner in the holes of the anode electrodes $g_2$ and $g_4$ so that the electrode $g_{2,4}$ picks up a minimum electron current. For the simplicity of explaining the relevant invention it is further assumed that the adjustable pulse value in the signal D,$Ug_3$ shown in FIG. 2 is a constant which need not be adapted to variations in the cathode and control electrode potential, which is not possible in practice but is irrelevant for the explanation.

Before explaining the invention the circuit arrangement according to FIG. 1 will be described with reference to the signals of FIG. 2a. The adjustable pulse generator 2 supplies the signal C,Uc shown in FIG. 2a with the desired adjusted pulse value +Vbc under the supply of the pulses in the signal C and a bias voltage Vbc. According to FIG. 2a the pulse generator 3 provides the signal $Ug_3$ with a pulse having a value of $+Vbg_3$ during only a first part $T_{BS1}$ of the line flyback time $T_{BS}$, while during the remaining second part $T_{BS2}$ the voltage value $+V_{S1}$ is present. This division will prove to be essential for the invention. For the purpose of illustration there applies for the times: $T_{BS1} = 6.5$ μs and $T_{BS2} = 1.5$ μs. The pulse generator 9 applies the signal B and the signal $\overline{C}$ through a signal inverter 10 to the variable pulse generator 8 to which furthermore a bias voltage $Vsg_1$ and a control voltage ($Vbg_1$) to be described hereinafter are applied in order that the signal $Ug_1$ of FIG. 2a is generated. Instead of the separate supply of the signals B and C to be described in a detailed embodiment, a signal combi- line flyback time $T_{BS}$ not shown the then occurring signal K was identical to the signal K shown in FIG. 2a so that there is no difference between the samples. The signals M and N are applied to inputs of a comparison circuit 14 while a reference bias $Vg_1$ is applied to a third input thereof. The signal M and the voltage $Vg_1$ in opposite phase (−) are combined with the signal N so that a signal N − M − $Vg_1$ occurs in the comparison circuit 14. The signal N − M − $Vg_1$ has a low constant direct voltage +$v$ of, for example, several millivolts in FIG. 2a. The comparison circuit 14 is formed with a signal amplifier for amplifying the signal N − M − $Vg_1$ to a signal P which is applied to the variable pulse generator 8. In FIG. 2a the signal P has a constant direct voltage having such a value $+p$ that the pulse value $-Vbg_1$ is given in the signal $Ug_1$ in the variable pulse generator 8 of FIG. 1 during the line flyback time $T_{BS}$, which leads through the circuit (6–14) to the signal P shown. The circuit (6–14) thus is in a stationary state with the signals shown in FIG. 2a. The clamping circuit 11 and the sample-and-hold circuits 12 and 13 constitute a measuring circuit (11, 12, 13) to which the signal H is applied so as to generate the signal $Ug_1$ with the pulse having a voltage of $-Vbg_1$ through the comparison circuit 14 and the variable pulse generator 8 by means of the circuit (6–14).

In the signal P in FIG. 2a the reference PR denotes a resistive value which is dependent on the voltage in the signal P. As will be apparent from a detailed embodiment of the variable pulse generator 8 (FIG. 3), the resistive value PR determines, under the control of the signal P, the pulse value of the signal $Ug_1$ during the time $T_{BS}$; a lower voltage than $+p$ will result in a larger resistive value PR and hence a less negative voltage in the signal $Ug_1$ during the time $T_{BS}$, and conversely.

In the circuit (6–14) the measuring circuit (11, 12, 13) is operative in an essential manner during the line flyback times $T_{BS}$ occurring during the field sweep. Unlike common practice the pulse duration in the signal $Ug_3$ of FIG. 2a etc. is not equal to the entire line flyback time $T_{BS}$ but it is only equal to the part $T_{BS1}$. The result is that only during the time $T_{BS1}$ the target $tg$ of the pick-up tube 1 of FIG. 1 is scanned with the electron beam $e_2$ with its erasing action. During the remaining time $T_{BS2}$ of the line flyback time $T_{BS}$ with the pulse value +Vbc still present in the signal Uc and $-Vbg_1$ in the signal $Ug_1$, the beam $e_2$ is not generated by the gun ACT, but an electron beam is generated with a current intensity which is several hundred times lower; this electron beam corresponds to the beam $e_1$ with, however, a cathode potential +Vbc and a control electrode potential $-Vbg_1$. It follows that for the effective erasing action on the target $tg$ during the flyback only the time $T_{BS1}$ is utilized which is sufficient for effective erasing. The described division of the time $T_{BS}$ in the times $T_{BS1}$ and $T_{BS2}$ results in the signal H shown in FIG. 2a being obtained. In fact, during the time $T_{BS1}$ the erasing beam $e_2$ is active so that a relatively small current flows through the resistor 4 to the electrode $g_{2,4}$ which is, however, much larger during the time $T_{BS2}$ because substantially the entire electron current flows to the electrode $g_{2,4}$ while during the beam blanking time $T_{BB}$ the resistor 4 does not convey current and only a small current flows through it during the line scan time $T_S$.

In the clamping circuit 11 the signal K of FIG. 2 is obtained with the ground potential O present during the beam blanking times $T_{BB}$ under the influence of the signal A with the clamping pulses. The difference between the voltages in the times $T_{BS1}$ and $T_{BS2}$ is indicated by a voltage value $k$ at the signal K of FIG. 2a. The voltage value $k$ is a measure of the current intensity of the electron beam $e_2$ which is available for erasing on the target $tg$, or in other words the voltage value $k$ is the result of a difference current measurement between the current which passes during erasing of the target $tg$ to the electrode $g_{2,4}$ ($T_{BS1}$) and the current to the electrode $g_{2,4}$ when erasing is not effected due to the increased lens voltage ($T_{BS2}$). Starting from the signal $Ug_3$ with an optimum voltage $+Vbg_3$ there follows that the voltage value $k$ is a measure of the maximum possible current intensity of the electron beam $e_2$ for erasing. This maximum value of the current intensity must be sufficient to perform the charge neutralization on the target $tg$ at the highest local light intensity but must not be much larger because of a then greater risk of persistence upon display (afterglow) and because of the occurrence in practice of an inadmissible dark current. The highly increased dark current is found to have a non-constant value in practice upon scanning over the surface of the target $tg$. An optimum value can be indicated between the two extreme limits for the maximum beam current intensity upon erasing of the target $tg$. Starting from a certain light level on the target $tg$ which corresponds to the so-called peak white value of a picture signal generated with the pick-up tube 1 a light level which must be many times higher, for example, in practice 32 times higher which can occur incidentally and locally must be processed by the gun ACT upon the line flyback. A given value of the voltage $k$ is suitable therefor, which value $k$ may be different for different pick-up tube types. When in a scene higher light intensities occur incidentally and locally a simple adaptation is possible by increasing the voltage value $k$. The said factor of 32 corresponds to a stepwise occurring diaphragm control range over five stages with a light intensity ratio after the diaphragm of from 1 to $2^5 = 32$.

For arbitrary adjustment of the voltage value $k$ in the signal K of FIG. 2a the reference bias $Vg_1$ is applied to the comparison circuit 14 of FIG. 1. The explanation follows from the signals M, N and N − M − $Vg_1$ of FIG. 2a. In fact, the signals K, M and N result in $k = N - M$ and the signal $N - M - Vg_1 = v$ results in the relation $k - Vg_1 = v$ or $Vg_1 = k - v$. In this case the value of $v$ is negligibly low relative to that of $k$, hence $Vg_1 \approx k$; for the purpose of illustration it is to be noted that the $v$ may be several millivolts and $k$ may be several volts.

Starting from the stationary state of the circuit (6–14) described with reference to FIG. 2a, FIGS. 2b and 2c show two successive transition states while FIG. 2d shows the end of the transition states and the commencement of a subsequent stationary state. A transition phenomenon has been introduced in FIG. 2b by increasing the bias $Vbc$ applied to the adjustable pulse generator 2 of FIG. 1 during the previous line scan time $T_S$ from the voltage $+Vbc$ to the voltage $+Vbc'$. The reason therefor may be a desired knee raise in the pick-up characteristic of the pick-up tube 1. The increase of the bias $Vbc$ may be effected manually or through another drive or control system which is irrelevant to the present invention. Since the voltage $-Vbg_1$ in the signal $Ug_1$ of FIG. 2b is present in an unchanged state, the result is that the control voltage between the control electrode $g_1$ and the cathode $c$ of the pick-up tube 1 has obtained a more negative value so that an electron beam $e_2$ is generated with a lower current intensity. The signal H as is applied to the measuring circuit (11, 12, 13) is plotted in FIG. 2b. At a certain percentual current reduction it is found that during the time $T_{BS2}$ the current to the electrode $g_{2,4}$ is greatly reduced in absolute value and is less large during the time $T_{BS1}$. The clamping circuit 11 provides the signal K shown in FIG. 2b from which the circuits 12 and 13 with the sampling pulse in the signals E and F derive the signals M and N, respectively. In the signal $N - M - Vg_1$ the relatively small voltage drop in the signal M results in a small voltage increase while the subsequent relatively large voltage drop in the signal N results in a large decrease in the signal $N - M - Vg_1$ relative to the previous voltage value $+v$. In the signal P of FIG. 2b the increased voltage drop is shown which occurs relative to the voltage value $+p$. The voltage drop in the signal P results in the resistive value PR increasing. A time delay then occurs because the resistance control does not admit abrupt variations. At the end of the duration shown in FIG. 2b there is a small increase of the resistance PR and the increase continues until the duration shown in FIG. 2c. The increase in the resistance PR in the pulse generator 8 of FIG. 1 has the result that a less negative voltage than $-Vbg_1$, which is denoted by $-Vbg_1'$ occurs in the signal $Ug_1$ of FIG. 2c during the time $T_{BS}$.

The less negative voltage $-Vbg_1'$ in the signal $Ug_1$ results in a less negative control voltage between the control electrode $g_1$ and the cathode c relative to the positive voltage $+Vbc'$ in the signal Uc of FIG. 2c, so that the beam current intensity during the time $T_{BS}$ in FIG. 2c is larger than that in FIG. 2b. The result is the signal H shown in FIG. 2c and the signal K derived therefrom. As is described with reference to FIG. 2b the signals M, N, $N-M-Vg_1$ and P follow from the signal K in FIG. 2c.

In the signal P of FIG. 2c a voltage increase occurs which upon the time delay of the control of the resistance PR in the pulse generator 8 of FIG. 1 will result in a smaller slope in the variation of the resistance PR.

Further time durations (not shown) periodically occurring with the line period $T_L$ analogously follow the time duration given in FIG. 2c which ultimately lead after some dozen line periods $T_L$ to the time duration shown in FIG. 2d. In the signal $Ug_1$ of FIG. 2d the voltage $-Vbg_1''$ occurs during the time $T_{BS}$. Here the voltage difference between the values $-Vbg_1$ (FIG. 2a) and $-Vbg_1''$ (FIG. 2d) is substantially equal to that between the values $+Vbc$ (FIG. 2a) and $+Vbc'$ (FIGS. 2b, 2c, 2d) so that the control voltage between the electrode $g_1$ and the cathode c in the pick-tube 1 of FIG. 1 is substantially the same for the cases shown in FIGS. 2a and 2d. As a result the signal H and the signal K derived therefrom occur in FIG. 2d while the voltage value $k$ described with reference to FIG. 2a in the signal K. The signal P emanates from the signal K of FIG. 2d through the signals M, N and $N - M - Vg_1$ with a direct voltage value of $+p'$. The voltage value $+p'$ of FIG. 2d which is lower than the value $+p$ of FIG. 2a corresponds to a larger resistance PR caused by the less negative voltage $-Vbg_1''$ in the signal $Ug_1$ during the time $T_B$. The duration shown in FIG. 2d is the last in which the transition phenomenon introduced in FIG. 2b is still present in the signal M, N, $N - M - Vg_1$ and P and thereupon a stationary state occurs which can be compared with the state described with reference to FIG. 2a with the essential difference that the voltage value $+p'$ instead of $+p$ occurs in the signal P.

When instead of an increase of the voltage $+Vbc$ in the signal Uc of FIG. 2a a decrease occurs, a converse transition phenomenon will occur resulting in an ultimately larger voltage value than $+p$ in the signal $+$ and the same voltage value $k$ in the signal K. It is found that the circuit (6–14) ensures that the optimum chosen and adjusted maximum current intensity value $(k)$ of the electron bam $e_2$ intended for erasing the target $tg$ in the pick-up tube 1 of FIG. 1 is automatically present under all circumstances.

It is found that due to the difference current measurement in the circuit (6–14) the effective beam current active at the target $tg$ for erasing is measured which is subsequently rendered equal and maintained equal to the chosen adjusted reference value $(k)$. By performing the current measurement and the additional control it is ensured that the correct beam current for erasing is always present independent of the non-linearly varying current control voltage characteristic of the gun ACT in the pick-up tube 1. Likewise ageing phenomena and the replacement of the pick-up tube by another having a deviating current-control voltage characteristic do not have any influence on the erasing beam adjustment.

For the choice of the reference value $(k)$ for the erasing beam current, the following applies for the purpose of illustration. Assuming that a mean current of 200 nA for the beam $e_1$ during the line scan time $T_S$ is necessary in the pick-up tube 1 for a scene having a certain light intensity and that the erasing action must be ensured up to the said factor of 35 for incidentally and locally occurring larger light intensities, while the beam $e_2$ is present during the time $T_{BS1} = 6.5$ μs and the beam $e_1$ is present during the time $T_S = 53$ μs, there follows for the current of the erasing beam $e_2$ that it must be equal to: $200 \times 32 \times 53 : 6.5 = 52.2$ μA. A certain value of the bias $Vg_1(k)$ corresponds to this current of the erasing beam $e_2$.

In the circuit arrangement according to FIG. 1 the measuring circuit (11, 12, 13) is connected to the composite anode electrode $g_{2,4}$ from which the signal H shown in FIG. 2 is derived. Instead of connection to the anode electrode $g_{2,4}$ in the electron gun ACT, a connection to the gauze anode electrode $g_6$ would be possible. In this case a signal is derived from the junction of the electrode $g_6$ and a measuring resistor whose other connection is connected to a supply resistor and a by-pass capacitor to ground, which signal as compared with the signal H shown in FIG. 2 initially has a large voltage drop during the time $T_{BS1}$ for erasing, subsequently a much lower voltage drop during the time $T_{BS2}$ and no voltage drop during the beam blanking time $T_{BB}$ relative to the supply voltage. In practice it is more favourable to utilize the electrode $g_{2,4}$ because its supply voltage of 250 V is much lower than that of 700 V for the electrode $g_6$ so that the circuit (6–14) for the measurement is connected to a lower voltage level. Furthermore a large capacitive coupling is present between the electrode $g_6$ of the target tg which is connected through the signal output of the pick-up tube 1 to a pre-amplifier so that a measurement at the electrode $g_6$ gives a much greater risk of interference signals in the output signal of the pre-amplifier than a measurement at the electron gun ACT.

FIG. 3 shows in detail an embodiment of a circuit arrangement according to the invention in which the components shown in FIGS. 1 and 2 and the signals have the same reference numerals. The composite anode electrode $g_{2,4}$ of the pick-up tube 1 is connected through a series arrangement of two resistors $4_1$ and $4_2$ to the terminal conveying the voltage $+V_{S1}$. The junction of the resistors $4_1$ and $4_2$ is connected to ground through a high-frequency bypass capacitor $4_3$. The anode electrode $g_{2,4}$ is connected through the capacitor 5 to the input 6 which is connected in the amplifier and clamping circuit 11 to the base electrode of an npn transistor 15 which is connected through resistors 16 and 17 to ground and to a terminal conveying a voltage $+V_{S2}$, respectively. The emitter electrode of the transistor 15 is connected through a resistor 18 in series with a parallel arrangement of a resistor 19 and a high-frequency bypass capacitor 20 to a terminal conveying a voltage $-V_{S2}$. The collector electrode of the transistor 15 is connected through a resistor 21 to the terminal conveying the voltage $+V_{S2}$ and is connected to the base electrode of an npn transistor 22 whose collector electrode is connected to the terminal conveying the voltage $+V_{S2}$. The emitter electrode of the emitter follower transistor 22 is connected to ground through a resistor 23 and is connected through a coupling capacitor 24 to the base electrode of an npn transistor 25 and to the drain electrode of a transistor 26 which is formed with an isolated gate electrode. The transistor 26 is of the n-channel type and its source electrode s is connected to ground while the isolated gate electrode is connected through a resistor 27 to a terminal to which the signal A with the clamping pulses according to FIG. 2 is applied. The collector electrode of the emitter follower transistor 25 is connected to the terminal conveying the voltage $+V_{S2}$ and the signal K of FIG. 2 occurs at the emitter electrode connected through a resistor 28 to the terminal conveying the voltage $-V_{S2}$. The circuit 11 thus includes an amplifier (15–21) and a clamping circuit (24, 26, 27).

The emitter electrode of the transistor 25 with the signal K is connected in the sample-and-hold circuit 12 to a resistor 29 the other connection of which is connected to the source electrode s of a transistor 30 of the n-channel type. The isolated gate electrode of the transistor 30 is connected through a resistor 31 to a terminal to which the signal E with the sampling pulses according to FIG. 2 is applied. The drain electrode of the transistor 30 is connected to ground through an electrolytic capacitor 32 and is connected to the isolated gate electrode of a transistor 33. The n-channel type transistor 33 has its drain electrode connected to the terminal conveying the voltage $+V_{S2}$ and its source electrode s connected through a resistor 34 to the terminal conveying the voltage $-V_{S2}$. The transistor 33 active as a source follower conveys the signal M of FIG. 2 at its source electrode. The circuit 12 includes a sampling circuit (29, 30, 31) with the transistor 30 which can conduct current in two directions and a hold circit (32, 33) in which the use of a transistor (33) with an isolated gate electrode prevents the leakage of charge of the capacitor 32 through the transistor 33.

The circuit 13 is identical to the circuit 12 so that it is not further referred to. By applying the signal F with the sampling pulses as shown in FIG. 2 to the circuit 13, it supplies the signal N.

The signals M and N originating from the circuits 12 and 13 are applied to two inputs of the comparison circuit 14 the third input of which is connected to a junction of two resistors 35 and 36 arranged in series between the terminal conveying the voltage $+V_{S2}$ and ground. The resistor 36 is adjustable so that the described voltage $Vg_1(k)$ to be selected can be applied to the third input. The reference voltage $Vg_1$ thus originates from a reference source (35,36).

In the comparison circuit 14 the voltage $Vg_1$ is applied through a resistor 37 to a junction with two further resistors 38 and 39. The signal M is applied to the said junction through the resistor 38. The signal N is applied in the circuit arrangement 14 through a resistor 40 to an inverting input (−) of an operational amplifier 41 whose non-inverting input (+) is connected to ground. The (−) input of the amplifier 41 is connected through a resistor 42 to its output which is connected through the resistor 39 to the said junction. Since the resistors 40 and 42 have the same value, the amplifier 41 is only active as a signal inverter for the signal N. The resistors 37, 38 and 39 have the same value so that a signal $Vg_1 + M − N = −(N − M − Vg_1)$ occurs at the junction. The components 37 to 42 constitute a signal combining circuit (37–42).

The junction of the resistors 37, 38 and 39 is connected to the (−) input of an operational amplifier 43 whose (+) input is connected to ground. The output of the amplifier 43 is fed back to the (−) input through a resistor 44 in series with a parallel arrangement of a resistor 45 and a capacitor 46 in series with a resistor 47. The components 43 to 47 constitute a signal amplifying, inverting and integrating amplifier (43–47) which supplies its output signal to the base electrode of an npn transistor 48. The signal integration with the capacitor 46 serves to prevent oscillations in the control system in which the circuit (6–14) is included. The collector electrode of the transistor 48 is connected through a resistor 48' to a terminal conveying a voltage $+V_{S3}$ while the emitter electrode conveying the signal P shown in FIG. 2 is connected to the variable pulse generator 8. The amplifier (43–47) amplifies the signal $−(N − M − Vg_1)$ of several millivolts negative direct voltage to the signal $P = \alpha \, (N-M-Vg_1)$ of several volts positive direct voltage.

In the comparison circuit 14 the voltage $Vg_1$ may be directly applied to the (+) input of the amplifier 43 which would thus form part of a signal combining circuit (38–43) instead of the given signal combining circuit (37–42) with the supply of the reference bias volage $Vg_1$. The given solution with the current addition through the resistors 37, 38 and 39 is preferred because in the given alternative a varying drift voltage present between the (+) and (−) inputs of the amplifier 43 would have a relatively great influence. The difference voltage between the (−) and (+) inouts is only several millivolts.

The variable pulse generator 8 receives the signal P of FIG. 2 at a first input and a second input receives the bias voltage $Vsg_1$ from a tap of a potentiometer 49 which is arranged in series with a resistor 50 between a terminal conveying a voltage $-V_{S5}$ and ground. The bias $Vsg_1$ is thus applied by an adjustable source (49,50). The second input is connected through a resistor 51 to the base electrode of a pnp transistor 52. The collector electrode of the transistor 52 is connected through a resistor 53 to the terminal conveying the voltage $-V_{S5}$ while the emitter electrode is connected to the negative terminal of an electrolytic capacitor 54 the other terminal of which is connected to ground and to a parallel arrangement of a resistor 55 and two series-arranged resistors 56 and 57. The resistor 57 is of the type having a resistance (PR) which is dependent on incident light. For controlling the resistor 57 a light-emitting element 58 is provided in its vicinity which for the purpose of supply is connected between ground and the input to which the signal P is applied. The resistor 57 and the light-emitting element 58 which may be formed, for example, as an incandescent lamp or as a light-emitting diode together constitute a controllable resistor (57,58). The junction of the resistors 55 and 56 is connected to the negative terminal of an electrolytic capacitor 59 the other terminal of which is connected to ground and to a resistor 60 which is connected to a terminal conveying a voltage $+ V_{S4}$. The components 52 to 60 constitute a potential divider (52–60) which is provided between the voltages $+V_{S4}$ and $-V_{S5}$. In this potential divider (52–60) negative voltages referred to as $-Vsg_1$ and $-Vbg_1$ are present at the connection points at the capacitors 54 and 59. The voltage $-Vsg_1$ lies an emitter base threshold voltage (of the transistor 52) above the negative bias $Vsg_1$. The voltage $-Vbg_1$ is determined by the resistance PR of the resistor 57 obtained under the influence of the light from element 58.

The emitter electrode of an npn transistor 61 is connected to the connection point conveying the voltage $-Vsg_1$ of the potential divider (52–60) and its base electrode is connected through a resistor 62 to the terminal conveying the voltage $+V_{S4}$ and through a capacitor 63 to a third input of the generator 8 to which the signal $\overline{C}$ is applied. The collector electrode of the transistor 61 is connected to the cathode of a diode 64. The anode of the diode 64 is connected to that of a diode 65 whose cathode is connected to the connection point conveying the voltage $-Vbg_1$. The anodes of the diodes 64 and 65 are connected through a capacitor 66 to a fourth input of the generator 8 to which the signal B is applied and are connected through a resistor 67 to the terminal conveying the voltage $+V_{S4}$ while they are directly connected to the base electrode of an npn transistor 68. The collector electrode of the transistor 68 is connected to ground and the emitter electrode is connected through a resistor 69 to the terminal conveying the voltage $-V_{S5}$. The emitter follower transistor 68 conveys the signal $Ug_1$ of FIG. 2 at its emitter electrode so as to be supplied to the input 7 which is connected to the control electrode $g_1$ in the pick-up tube 1.

In the variable pulse generator 8 the transistor 61 and the diodes 64 and 65 are active as switches through which the voltages $-Vsg_1$ and $-Vbg_1$ of the potential divider (52–60) can occur in the signal $Ug_1$ of FIG. 2. During the line scan times $T_S$ there applies that the transistor 61 is in its conducting state and consequently the diode 64 so that the voltage at the base electrode of the transistor 68 is equal to a negative voltage which is the sum value of the voltage drop across the collector emitter of the transistor 61 and across the anode cathode of the diode 64 is less negative than the voltage $-Vsg_1$. In this case the diode 65 is blocked because the voltage $-Vbg_1$ at the cathode is less negative than that at the anode. Apart from the small voltage drop across the conducting transistor 61 the voltage $-Vsg_1$ occurs in the signal $Ug_1$ during the line scan times $T_S$ in case the voltage drop across the anode cathode of diode 64 is equal to the base emitter threshold voltage of the transistor 68.

During the line flyback time $T_{BS}$ of, for example, FIG. 2a a negative going pulse is present in the signal $\overline{C}$ while the transistor 61 is cut off. The voltage at the base electrode of the transistor 68 will become less negative after cutting off of the transistor 61 at the start of the time $T_{BS}$ due to the positive charge supply through the resistor 67 until the base voltage reaches a negative voltage which is equal to the voltage $-Vbg_1$ minus the threshold voltage across the diode 65. The diode 65 is then rendered conducting so that in the signal $Ug_1$ the voltage $-Vbg_1$ occurs during the line flyback time $T_{BS}$ of FIG. 2a.

Subsequently a positive or negative going voltage step occurs in the signals $\overline{C}$ and B, respectively, at the commencement of the beam blanking time $T_{BB}$. The signal $\overline{C}$ thereby releases the transistor 61 and the voltage $-Vsg_1$ becomes available through the then conducting diode 64 at the base electrode of the transistor 68 in which, however, the negative voltage step in the signal B immediately blocks the diode 64 again. As a result the negative voltage step in the signal B occurs equally large in the siganl $Ug_1$ relative to the voltage $-Vsg_1$.

For the pulse generator 8 of FIG. 3 there follows for the transition state described with reference to FIGS. 2b and 2c that the smaller supply voltage in the signal P(smaller than $+p$) increases the resistance PR after some time delay by the light-emitting element 58, the resistor 57 and the integration caused by the capacitor 59 and the resistor 60 so that the voltage $-Vbg_1$ becomes less negative with respect to the voltages $-Vbg_1'$ and $-Vbg_1''$ while the new stationary state according to FIG. 2d occurs with the voltage $+p'$.

A higher supply voltage than $+p$ in the signal P of FIG. 2a causes a lower resistance PR of the resistor 57 due to more light so that a more negative voltage than $-Vbg_1$ will occur at the cathode of diode 65.

Another adjustment of the bias $Vsg_1$ of FIG. 3 results, for an equal voltage $+Vbc$ in signal $Uc$(FIG. 2a) in the first instance in a variation in the voltage $-Vbg_1$ of the potential divider (52–60). A more negative value of the voltage $-Vsg_1$ results through the potential divider (52–60) in a more negative value of the voltage $-Vbg_1$ so that the control voltage between the control electrode $g_1$ and the cathode $c$ of the pick-up tube 1 becomes more negative and a smaller current intensity of the beam $e_2$ for erasing is obtained. The circuit (6–14)

then detects in the signal K a voltage value which is lower than the adjusted reference value $k$. As a result a supply voltage for the light-emtting element 58 will occur in the signal P, which voltage is lower than the value $+p$ so that the resistance PR of the resistor 57 increases until the correct less negative voltage $-Vbg_1$ is present at the cathode of the diode 65 again. It is found that a variation of the bias $Vsg_1$, which is desired by some reason or other for the scan time $T_S$, does not have any influence after a transition state on the voltage $-Vbg_1$ in the potential divider (52–60); also in this case the adjusted ($k$) beam current for erasing remains present.

Not only in television cameras having one pickup tube can the circuit arrangement (6–14) be advantageously used but also in colour television cameras having a plurality of pick-up tubes. In the multi-tube cameras the described inadmissible dark currents upon display would lead to unacceptable colour errors while an insufficient erasing in one or more of the tubes would lead to coloured comet tails behind moving parts in the scene. The guarantee obtained by the circuit arrangement (6–14) that an optimum erasing action is present under all circumstances without time consuming variations in adjustments being necessary is a great advantage.

For the purpose of illustration some further data as may occur in the practical embodiment of the circuit arrangement and the pick-up tube follow below:

Supply voltages:
$V_{S1} = 250$ V, $V_{S2} = 12$ V, $V_{S3} = 6$ V, $V_{S4} = 150$ V, $V_{S5} = 90$ V Some pulse times:
$T_L = 64$ μs, $T_B = 11$ μs, $T_{BS} = 8$ μs, $T_{BS1} = 6.5$ μs Some signal values:
B: pulse height 60 V
C: pulse height 6 V
Uc: $+Vbc$ adjustable from 0 to $+15$V
$Ug_1$: $-Vsg_1$ adjustable from $-90$ to 0 V dependent on type and tolerances in the pick-up tube; $-Vbg_1$ with control range of 5 to 40 V positive relative to $-Vsg_1$; $Vg_1(k)$ adjustable from 0 to $+6$ V which dependent on type of pickup tube corresponds to an adjustable erasing beam current up to several hundred μA
$Ug_3$: $+Vbg_3$ adjustable from $+4$ to $+35$ V, controllable Further voltages in the pick-up tube:
$Vg_5$: $+500$ V
$Vg_6$: $+700$ V
$Vtg$: $+45$ V

What is claimed is:

1. A circuit arrangement suitable for use in a television pick-up tube provided with an anti-comet tail electron gun, formed with a cathode, a control electrode, anode electrodes and a lens electrode for generating during line scan times and line flyback times an electron beam having different values for the beam diameter, beam current intensity and beam potential upon impingement of a target present in the tube under the control of a control voltage between the control electrode and the cathode having a cathode potential and a lens voltage between the lens electrode and an adjacent anode electrode, one line period being constituted by the line scan time and a line blanking time comprising the line flyback time and a beam blanking time, said circuit arrangement comprising an input means for coupling generator including a potential divider having a plurality of connection points, a plurality of switch means for coupling said points to the output of the variable pulse generator under the control of a switching signal, the potential divider including a controllable resistor coupled to said first input, further being coupled to said second input to which the adjustable source is coupled.

2. A circuit arrangement as claimed in claim 1, wherein the measuring circuit comprises a clamping circuit coupled to the input of the circuit arrangement and a first and a second sample-and-hold circuit coupled to the clamping circuit, and further comprising a pulse generator having a plurality of outputs, one output conveying a signal with a clamping pulse during the beam blanking times being coupled to the clamping circuit and one output conveying a signal with a sampling pulse during said first and second parts of the line flyback times being coupled to the first and second sample-and-hold circuits, respectively.

3. A circuit arrangement as claimed in claim 1, wherein the comparison circuit comprises three inputs two of which are coupled to the measuring circuit and one is coupled to a reference source means for suppling the said reference value, a signal combining circuit coupled to said inputs and including a signal inverter coupled to one of the inputs coupled to the measuring circuit, the output of the signal combining circuit being coupled to the variable pulse generator.

4. A circuit arrangement as claimed in claim 3, wherein the comparison circuit further comprises an integrating amplifier coupled between the signal combining circuit and the variable pulse generator.

5. A circuit arrangement as claimed in claim 1, wherein the variable pulse generator comprises at least three inputs, a first of which is coupled to the comparison circuit, a second is coupled to an adjustable source, and a third input means is coupled to an output of the pulse generator for supplying a switching signal with pulses during the line flyback time and the beam blanking time, respectively, said variable pulse to one of said anode electrodes provided in the pick-up tube, a measuring circuit coupled to said input means which is active during the line blanking time, the cathode potential and the control voltage being increased during the line flyback time and the lens voltage is decreased during a first part of the line flyback time for obtaining the target scanning, said measuring circuit comprising means for a difference current measurement at the said anode electrode between the current during the said first part of the line flyback time and that during a second part thereof, a comparison circuit means coupled to said measuring circuit for comparing the result of said current measurement with a reference value, a varaible pulse generator means coupled to said comparison circuit for generating with a pulse height to be varied a pulse having the line flyback duration, and an output means of the circuit arrangement coupled to said generator and for coupling to said control electrode of the pick-up tube.

6. A circuit arrangement as claimed in claim 5, wherein the third input and a fourth input of the variable pulse generator are coupled to said pulse generator, the switching signal with pulses during the line flyback time occurs at one input and the switching signal with pulses during the beam blanking time occurs at the other input.

7. A circuit arrangement as claimed in claim 5, wherein the controllable resistor in the potential divider comprises a resistor having a light-dependent resistance and a light-emitting element disposed proximate said resistor and is coupled to said first input of the variable pulse generator which is coupled to the comparison circuit.

8. A circuit arrangement as claimed in claim 1, further comprising said tube, the input of the circuit arrangement being coupled to an anode electrode in the pick-up tube which is provided in the vicinity of the lens electrode in the electron gun.

9. A circuit arrangement as claimed in claim 1, further comprising said tube, the input of the circuit arrangement being coupled to an anode electrode in the pick-up tube provided near the target.

* * * * *

UNITED STATES PATENT AND TRADEMARK OFFICE
CERTIFICATE OF CORRECTION

PATENT NO. : 3,955,116
DATED : May 4, 1976
INVENTOR(S) : WOUTER VAN DEN BERG

It is certified that error appears in the above-identified patent and that said Letters Patent are hereby corrected as shown below:

Page 1 of 3

IN THE SPECIFICATION

Column 5, line 27, after "combi-" it should read as follows:

--nation of the signals B and $\overline{C}$ might be applied to the pulse generator 8 so that there are only three inputs.

For generating the control voltage ($Vbg_1$) the input 6 of the circuit arrangement (6,7) according to the invention is connected to a clamping circuit 11 in which a signal amplifier is present. The pulse generator 9 applies the signal A with clamping pulses occurring during the beam blanking times $T_{BB}$ to the clamping circuit 11. Starting from a signal H shown in Figure 2a and to be described hereinafter, which signal is present at the junction of the resistor 4 and the capacitor 5 the clamping circuit 11 supplies a signal K. The clamping circuit 11 applies the signal K to first and second sample-and-hold circuits 12 and 13.

The signal E having sampling pulses occurring during the first part $T_{BS1}$ of the line flyback times $T_{BS}$ is applied by the pulse generator 9 to the circuit 12 while the circuit 13 receives the signal F with sampling pulses occurring in the second part $T_{BS2}$. The circuit 12 supplies a signal M which is plotted in Figure 2a with a constant direct voltage equal to the voltage value instantaneously occurring upon sampling of the signal K. Likewise the circuit 13 supplies a signal N with a constant direct voltage which is equal to the value in the signal K instantaneously occurring upon sampling. The signals M and N have a constant direct voltage in Figure 2a because it is assumed that during a previous--

UNITED STATES PATENT AND TRADEMARK OFFICE
CERTIFICATE OF CORRECTION

PATENT NO. : 3,955,116
DATED : May 4, 1976
INVENTOR(S) : WOUTER VAN DEN BERG

It is certified that error appears in the above-identified patent and that said Letters Patent are hereby corrected as shown below:

Page 2 of 3

IN THE CLAIMS

Claim 1, line 16, after "coupling" it should read as follows:

--to one of said anode electrodes provided in the pick-up tube, a measuring circuit coupled to said input means which is active during the line blanking time, the cathode potential and the control voltage being increased during the line flyback time and the lens voltage is decreased during a first part of the line flyback time for obtaining the target scanning, said measuring circuit comprising means for a difference current measurement at the said anode electrode between the current during the said first part of the line flyback time and that during a second part thereof, a comparison circuit means coupled to said measuring circuit for comparing the result of said current measurement with a reference value, a variable pulse generator means coupled to said comparison circuit for generating with a pulse height to be varied a pulse having the line flyback duration, and an output means of the circuit arrangement coupled to said generator and for coupling to said control electrode of the pick-up tube.

UNITED STATES PATENT AND TRADEMARK OFFICE
CERTIFICATE OF CORRECTION

PATENT NO. : 3,955,116
DATED : May 4, 1976
INVENTOR(S) : WOUTER VAN DEN BERG

It is certified that error appears in the above-identified patent and that said Letters Patent are hereby corrected as shown below:

Claim 5, line 8 after "pulse" it should read as follows:

--generator including a potential divider having a plurality of connection points, a plurality of switch means for coupling said points to the output of the variable pulse generator under the control of a switching signal, the potential divider including a controllable resistor coupled to said first input, further being coupled to said second input to which the adjustable source is coupled.--

Signed and Sealed this

Eighteenth Day of October 1977

[SEAL]

Attest:

RUTH C. MASON
*Attesting Officer*

LUTRELLE F. PARKER
*Acting Commissioner of Patents and Trademarks*